No. 782,960. PATENTED FEB. 21, 1905.
M. T. HARRIS.
ATTACHMENT FOR HARVESTERS.
APPLICATION FILED OCT. 17, 1904.

WITNESSES:
H. F. Koyle.
M. A. Schmidt

INVENTOR
Milton T. Harris
BY
Milo B. Stevens and Co.
Attorneys

No. 782,960.

Patented February 21, 1905.

UNITED STATES PATENT OFFICE.

MILTON THOMAS HARRIS, OF CRETE, NEBRASKA.

ATTACHMENT FOR HARVESTERS.

SPECIFICATION forming part of Letters Patent No. 782,960, dated February 21, 1905.

Application filed October 17, 1904. Serial No. 228,865.

*To all whom it may concern:*

Be it known that I, MILTON THOMAS HARRIS, a citizen of the United States, residing at Crete, in the county of Saline and State of Nebraska, have invented new and useful Improvements in Attachments for Harvesters, of which the following is a specification.

My invention relates to an attachment for harvesters, and more particularly an attachment to be coupled thereto to furnish or augment the necessary power required to run the operating parts when the ground is soft and muddy and the ordinary ground-wheels of the machine slide and fail to properly perform their function.

The invention consists in an element rotatable by contact with the ground, said element being detachably connected to the harvester and drawn thereby. A gearing is also provided for transmitting the motion of the element to a driven part of the harvester.

Figure 1:
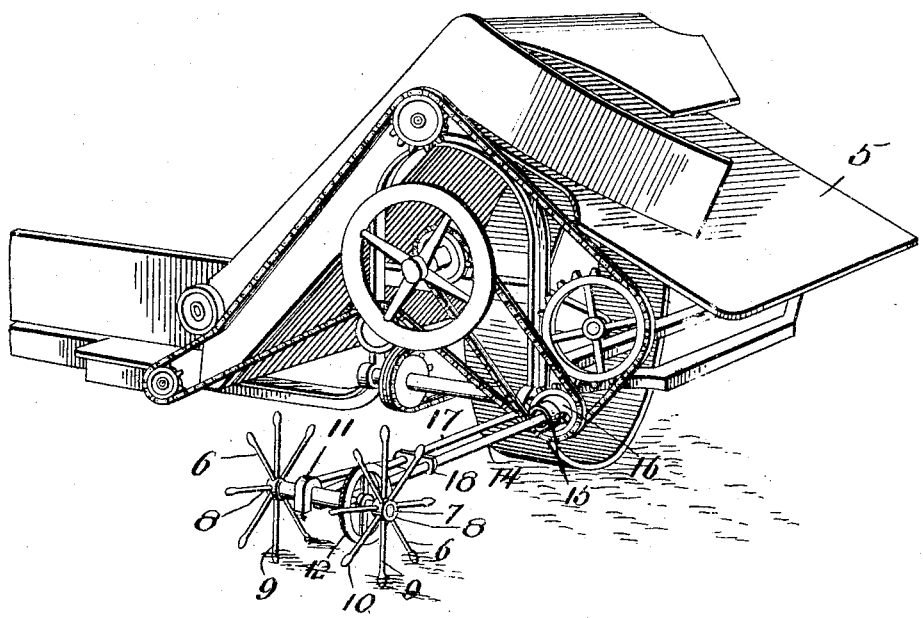
Figure 2:
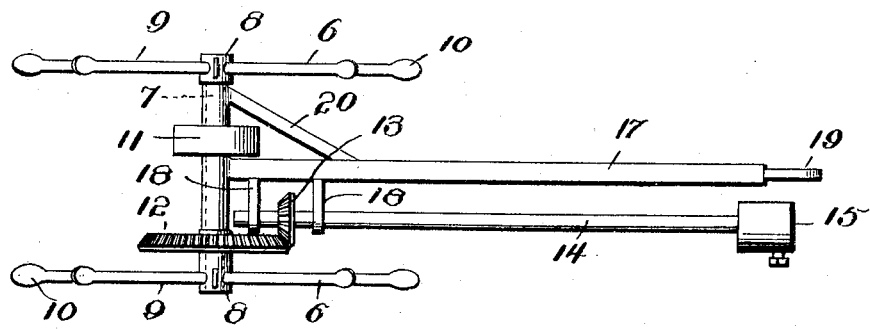

In the accompanying drawings, Figure 1 is a perspective view of a harvester with the invention coupled thereto. Fig. 2 is a plan view of the invention detached.

Referring specifically to the drawings, 5 denotes the harvester as a whole and which may be any one of the various styles of machines of this character now in use, nothing being claimed with respect thereto.

At 6 is indicated a pair of spider-wheels which are mounted on an axle 7. The said wheels comprise hubs 8 and radially-extending spokes 9, the outer ends of which are flat or paddle-shaped, as indicated at 10. When the attachment is dragged over the ground, the wheels will turn, and when the ground is soft or muddy the outer ends 10 will enter the ground sufficiently to prevent slipping. To insure the proper operation of the attachment, it can be weighted, if necessary, by placing a weight, as indicated at 11, on the axle.

At 12 is indicated a bevel-gear which is fast on the axle and meshes with a bevel-gear 13 on a shaft 14. This shaft is connected by a knuckle-joint 15 to the drive-sprocket 16 of the harvester. It will be obvious that the rotary motion of the axle will be communicated to the sprocket 16 by the gearing just described, so that if the ground-wheels of the harvester should slip the operating parts will not stop, but will continue to run, the power being furnished by the attachment.

It is to be understood that the gearing of the attachment will be so proportioned that the rate of motion transmitted thereby will be the same as that transmitted by the ground-wheels and gearing of the machine.

At 17 is indicated a tongue extending from the axle of the attachment for coupling the same to the rear of the harvester. It can be fastened thereto in any suitable place, depending on the particular construction of the machine. In the preferred form of my invention the shaft 14 is supported in bearings 18, which are carried by the tongue. The latter has at its front end a hook 19 to engage a suitable place on the rear end of the harvester. A brace 20 extends between the axle and the tongue. In use the gears will be inclosed in a suitable housing to protect them from mud and dust.

The attachment can be readily coupled to the harvester when needed, and its use results in a saving of grain which would be wasted by the stoppage of the operating parts of the harvester when its ground-wheels slip. When not needed, it can be readily uncoupled.

It will be understood that various changes can be made in the arrangement of the parts without departing from the spirit of the invention. Any other suitable device for transmitting motion may be substituted for the bevel-gearing shown.

Having thus described my invention, what is claimed as new, and desired to be secured by Letters Patent, is—

1. The combination with a harvester, of a supplemental driving attachment therefor comprising an element rotatable by contact with the ground, said element being detachably connected to the harvester and drawn thereby, and a gearing between the said element and a driven part of the harvester to transmit the motion of the former.

2. The combination with a harvester, of a supplemental driving attachment therefor comprising a spider-wheel which travels on the ground and is detachably connected to the harvester and drawn thereby, and a gearing between the spider-wheel and a driven part of the harvester, constructed to transmit the motion of the former to the latter.

3. The combination with a harvester of a supplemental driving attachment therefor comprising an axle, a pair of spider-wheels thereon, a tongue extending from the axle and detachably connected to the harvester, a bearing on the tongue, a shaft in the bearing and flexibly connected at one end to a driven part of the harvester, a gear-wheel on the opposite end of the shaft, and a gear-wheel on the axle and in mesh with the other gear-wheel.

In testimony whereof I have signed my name to this specification in the presence of two subscribing witnesses.

MILTON THOMAS HARRIS.

Witnesses:
  O. E. HARRIS,
  C. B. ANDERSON.